US008869035B2

(12) United States Patent
Banerjee et al.

(10) Patent No.: US 8,869,035 B2
(45) Date of Patent: Oct. 21, 2014

(54) INCREASING RESILIENCE OF A NETWORK SERVICE

(75) Inventors: Dipyaman Banerjee, New Delhi (IN); Venkateswara R Madduri, New Delhi (IN); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1147 days.

(21) Appl. No.: 12/493,806

(22) Filed: Jun. 29, 2009

(65) Prior Publication Data

US 2010/0332991 A1 Dec. 30, 2010

(51) Int. Cl.
*G06F 3/00* (2006.01)
*G06F 9/00* (2006.01)
*G06F 17/00* (2006.01)
*H04L 12/24* (2006.01)
*H04L 12/26* (2006.01)

(52) U.S. Cl.
CPC ............... *H04L 41/12* (2013.01); *H04L 41/22* (2013.01); *H04L 43/10* (2013.01)
USPC ............................ 715/736; 715/734; 715/733

(58) Field of Classification Search
USPC ......................................... 715/736, 734, 733
See application file for complete search history.

(56) References Cited

U.S. PATENT DOCUMENTS

| 6,331,905 | B1 * | 12/2001 | Ellinas et al. ...................... 398/2 |
| 7,328,363 | B2 | 2/2008 | Mukherjee |
| 7,836,056 | B2 * | 11/2010 | Meijer et al. ................... 707/741 |
| 2005/0165901 | A1 | 7/2005 | Bu et al. |
| 2007/0053300 | A1 * | 3/2007 | Zhu et al. ....................... 370/238 |
| 2008/0140495 | A1 | 6/2008 | Bhamidipaty et al. |
| 2011/0004581 | A1 * | 1/2011 | Schmidt et al. ................. 706/55 |

OTHER PUBLICATIONS

Toshimasa Ishii, Greedy Approximation for Source Location Problem wtih Vertex-Connectivity Requirements in Undirected Graphs, International Symposium on Algorithms and Computation (ISAAC) 2007, LNCS 4835, pp. 29-40, 2007.
Yigal Bejerano, Robust Monitoring of Link Delays and Faults in IP Networks, IEEE/ACM Transactions on Networking, vol. 14, No. 5, Oct. 2006, pp. 1092-1103.
Rosenkrantz et al., Structure-Based Resilience Metrics for Service-Oriented Networks, Dependable Computing—EDCC-5, 5th European Dependable Computing Conference, Budapest, Hungary, Apr. 20-22, 2005, Proceedings, pp. 1-20.

(Continued)

*Primary Examiner* — Boris Pesin
*Assistant Examiner* — Sabrina Greene
(74) *Attorney, Agent, or Firm* — Ryan, Mason & Lewis, LLP

(57) ABSTRACT

A set of data is obtained, representing a graph of a computer network having a set of hardware nodes and a set of hardware links between the hardware nodes. The hardware links are represented as edges in the graph. A first subset (for example, a vertex cut set) of the set of hardware nodes is found, such that those of the hardware nodes in the first subset are able to withstand a maximum number of failures before the graph disconnects. The failures include node failures and/or edge failures. The hardware nodes in the first subset are ranked based on expected resiliency, to obtain a ranked list. Optionally, in case of a tie between two or more of the hardware nodes in the ranked list, the tie is broken using a sum of shortest path metric.

20 Claims, 11 Drawing Sheets

(56) References Cited

OTHER PUBLICATIONS

Najjar et al., Network Resilience: A Measure of Network Fault Tolerance, IEEE Transactions on Computers, vol. 39, No. 2, Feb. 1990, pp. 174-181.

Chang et al., Maximizing Resilient Throughput in Peer-to-Peer Network: A Generalized Flow Approach, INFOCOM 2008, The 27th Conference on Computer Communications. IEEE; Apr. 13-18, 2008 pp. 2458-2466.

* cited by examiner

200

300

500

600

700

VC = {{D0},{R1}, {R2}}

800

NUMBER OF EDGE-INDEPENDENT PATHS FROM D0, R1, R2 TO OTHER NODES

|    | D0 | R1 | R2 | D1 | D2 | D3 | D4 |
|----|----|----|----|----|----|----|----|
| D0 | X  | 1  | 1  | 1  | 1  | 1  | 1  |
| R1 | 1  | X  | 1  | 1  | 1  | 1  | 1  |
| R2 | 1  | 1  | X  | 1  | 1  | 1  | 1  |

900

NUMBER OF HOPS FROM D0, R1, R2 TO OTHER NODES

|    | D0 | R1 | R2 | D1 | D2 | D3 | D4 | SUM |
|----|----|----|----|----|----|----|----|-----|
| D0 | X  | 1  | 1  | 2  | 2  | 2  | 2  | 10  |
| R1 | 1  | X  | 2  | 1  | 1  | 3  | 3  | 11  |
| R2 | 1  | 2  | X  | 3  | 3  | 1  | 1  | 11  |

1100

NUMBER OF EDGE-INDEPENDENT PATHS
FROM R1, R2, R3 TO OTHER NODES

|    | R1 | R2 | R3 | D0 | D1 | D2 | D3 | D4 |
|----|----|----|----|----|----|----|----|----|
| D0 | 2  | 2  | 2  | X  | 2  | 2  | 2  | 2  |
| R1 | X  | 3  | 3  | 2  | 2  | 2  | 2  | 2  |
| R2 | 2  | X  | 2  | 2  | 2  | 2  | 2  | 2  |
| R3 | 2  | 2  | X  | 2  | 2  | 2  | 2  | 2  |

1300

VC = {{B,D},{B,H},{B,F},{D,F},{D,H},{F,H}}

1400

1500

BETWEEN B AND F:
NUMBER OF EDGE-INDEPENDENT PATH = NUMBER OF VERTEX INDEPENDENT PATH

1500

INCREASING RESILIENCE OF A NETWORK SERVICE

STATEMENT REGARDING FEDERALLY SPONSORED RESEARCH OR DEVELOPMENT

This invention was made with Government support under contract number W911NF-06-3-0001 awarded by the United States Army. The government has certain rights in this invention.

FIELD OF THE INVENTION

Embodiments of the invention relate to the electrical, electronic and computer arts, and, more particularly, to network services and the like.

BACKGROUND OF THE INVENTION

Network services are typically employed in a networked computing environment. They may, for example, be installed on one or more servers or other network nodes. They may provide, for example, shared resources to client computers. Examples of network services include DNS (Domain Name System), DHCP (Dynamic Host Control Protocol), e-mail, printing, network file sharing, authentication servers, directory services, monitoring services, and the like. It is desirable that network services be tolerant of faults in the network.

U.S. Pat. No. 7,328,363 discloses dynamically configurable fault tolerance in autonomic computing with multiple service points. In particular, a method is described for configuring a system having a plurality of processors to provide the system with at least one cluster of processors, where each cluster has one service point. A distance is computed from each processor to other processors in the system. A plurality of total distances is then computed, where each total distance is associated with one processor. A minimum total distance is determined from the plurality of total distances. One processor is assigned to be the service point; this processor is the processor having the minimum total distance associated therewith.

SUMMARY OF THE INVENTION

Principles of the invention provide techniques for increasing resilience of a network service. In one aspect, an exemplary method (which can be computer-implemented) includes the step of obtaining a set of data representing a graph of a computer network having a set of hardware nodes and a set of hardware links between the hardware nodes. The hardware links are represented as edges in the graph. An additional step includes finding a first subset (for example, a vertex cut set) of the set of hardware nodes, such that those of the hardware nodes in the first subset are able to withstand a maximum number of failures before the graph disconnects. The failures include at least one of node failures and edge failures. A still further step includes ranking the hardware nodes in the first subset based on expected resiliency, to obtain a ranked list. Optionally, in case of a tie between two or more of the hardware nodes in the ranked list, break the tie with a sum of shortest path metric.

One or more embodiments of the invention or elements thereof can be implemented in the form of a computer product including a tangible computer readable recordable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

One or more embodiments of the invention may offer one or more of the following technical benefits:
rapid analysis of network topology to increase resiliency of a network service
applicability to most or all network topologies
easy integration with overall resiliency of enterprise information technology (IT) systems and/or overall organizational resiliency
The approach is adaptive as it captures and uses the current stochastic distribution of network faults.

These and other features, aspects and advantages of the invention will become apparent from the following detailed description of illustrative embodiments thereof, which is to be read in connection with the accompanying drawings.

DETAILED DESCRIPTION OF PREFERRED EMBODIMENTS

Network nodes and links can fail with non-zero probability. A network service should be resilient to failures. Multiple failures can occur in a short interval. Resiliency through service replication may not be always feasible due to network resource constraints and increase in cost. One or more embodiments of the invention increase, and preferably maximize, resiliency; for example, by reducing and preferably minimizing the expected number of consumer nodes disconnected from the network service and the rate at which the disconnection occurs. Position of the service-offering node and its connectivity to consumer nodes can impact resiliency of the service. Good, and preferably optimal, positioning of a service can be employed to increase, and preferably maximize, resiliency.

In one or more embodiments, given a network graph, find an optimal node M to be used as a service provider, such that, given the stochastic distribution of network faults, selection of M maximizes expected resiliency of the service. The total "distance" from M to all other nodes must be minimum compared to all other nodes who are equally resilient as M. In particular, in one or more embodiments, find the vertex cut-set to narrow down the candidate nodes which are more resilient than any other nodes. Use Menger's theorem to calculate edge independent paths to all other nodes from the nodes in the vertex cut-set. Each independent path is weighted with the marginal probability of failures along the path. Use a tournament method to choose the node with the maximum number of edge independent paths to most of the nodes.

One or more embodiments provide a method to maximize resiliency of a network service, including techniques to find the expected resiliency of a service deployed at a particular node in a network, as well as a near-optimal polynomial-time method to select a node from a given network of nodes such that it maximizes the expected resiliency of a service deployed at that node.

A non-limiting example of a situation in which one or more techniques of the invention might be of use is that of a distributed implementation of Tivoli Netcool® Precision (Tivoli Network Manager) software (registered mark of International Business machines Corporation, Armonk, N.Y., USA), which requires partitioning a network into multiple domains and monitoring each of these domains concurrently. A monitoring service should be resilient to node or link failures in a domain. Achieving resiliency by replicating the monitoring service may not be always feasible due to network constraints and increase in cost. Each domain typically has one monitor that monitors all the nodes in that domain. The cost of placing multiple monitors in a domain is very high and also increases the complexity of root-cause analysis. There is typically no control over selecting the set of nodes to be placed under one monitor, as the monitor can be placed only after the partitioning is decided.

Figure 1:
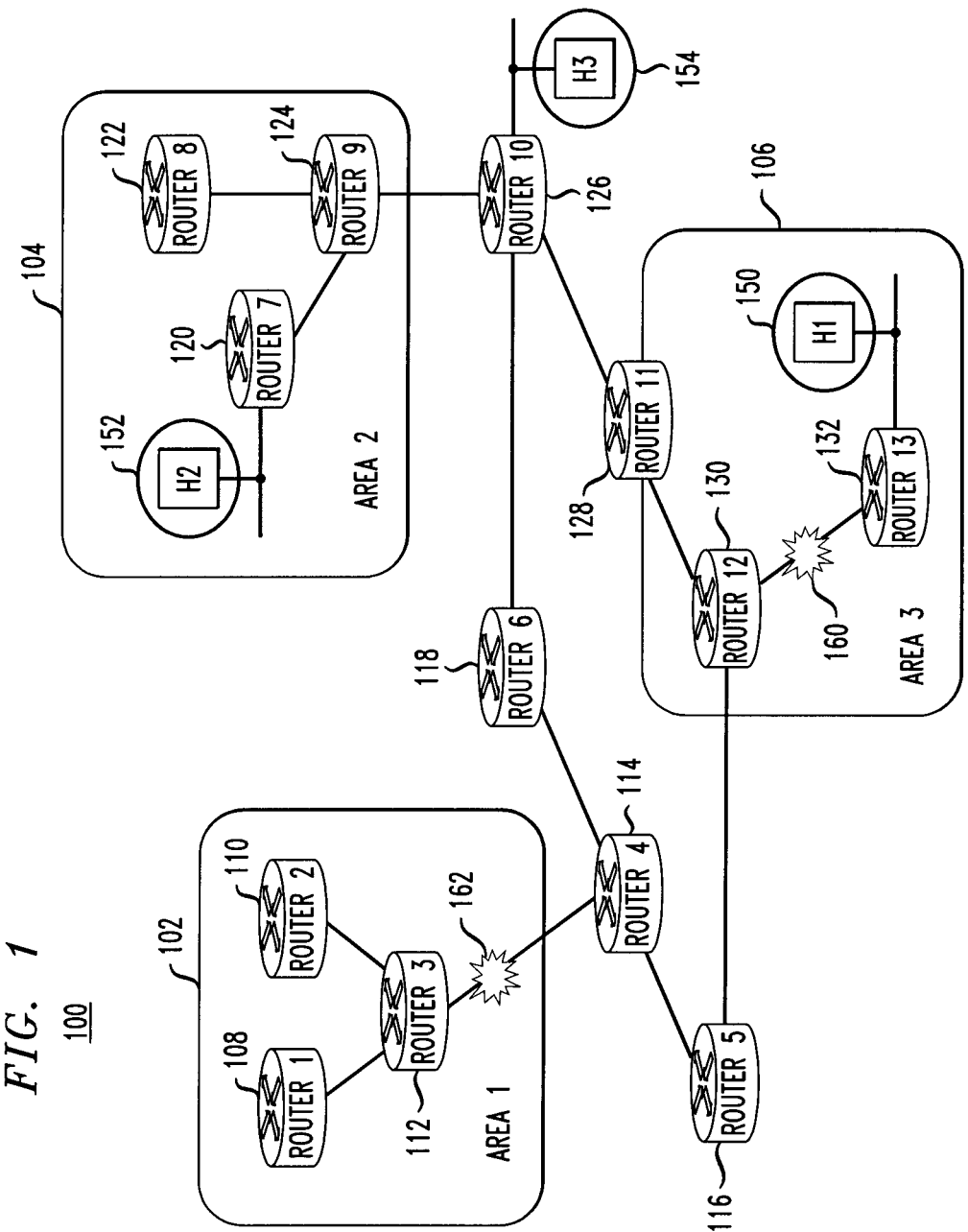
FIG. 1 depicts a first exemplary network, with prudent location of a monitor, in accordance with an aspect of the invention.

With reference to FIG. 1, which depicts a first exemplary network 100, the link between H1 150 and thirteenth router 132 is a local area network (LAN) link, while the links between the first through thirteenth routers 108, 110, 112, 114, 116, 118, 120, 122, 124, 126, 128, 130, 132 are wide area network (WAN) links, which are more prone to failure as compared to the more stable LAN links. Note the three areas 102, 104, 106. H1, H2, H3 are terminal nodes. The monitor can be placed in H1, H2, or H3, numbered, respectively, 150, 152, and 154. If H1 is chosen and the link between twelfth router 130 and thirteenth router 132 is broken, as shown at 160, then the entire network 100 cannot be monitored. However, if H3 is chosen, then the worst that happens is when either the link between the third and fourth routers 112, 114 fails, as at 162, or the link between the ninth and tenth routers 124, 126 fails, in which case, the connection is lost with only a few nodes. Accordingly, H3 is a preferred location over H1.

Figure 2:
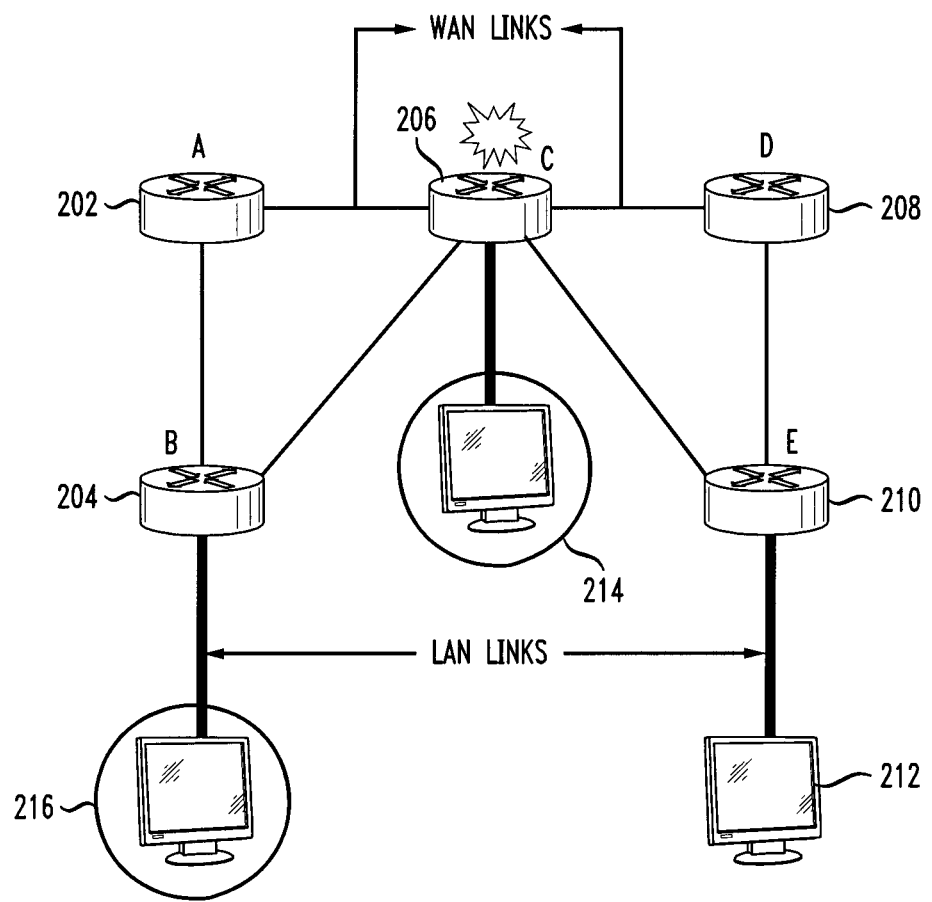
FIG. 2 depicts a second exemplary network, with prudent location of a monitor, in accordance with another aspect of the invention.

FIG. 2 depicts a second exemplary network 200, with $A^{th}$ router 202 through $E^{th}$ router 210 connected by WAN links as well as generalized network nodes 212, 214, 216 connected to corresponding routers by LAN links. If the terminal node connected to the $B^{th}$ router 204 is chosen as the monitor, at least two links (that is, the link with $A^{th}$ router 202 and the link with $C^{th}$ router 206) need to fail before any node is disconnected (assuming the LAN link does not fail). However, nodes can also fail in the network as frequently as links. If $C^{th}$ router 206 fails, then $B^{th}$ router 204 loses its connection with $D^{th}$ router 208 and $E^{th}$ router 210. If $C^{th}$ router 206 is chosen as the monitor, at least two links need to fail before any node is disconnected, and node failure cannot disconnect the graph. Accordingly, $C^{th}$ router 206 is a better location than $B^{th}$ router 204.

Expected Resiliency of a Service

Given a network graph G=(V, E) where V is the set of nodes (devices) and E is the set of edges (links) among the nodes, let:

f ⊂ E, P(f) be the probability of all edges in f to fail together;
$R_m$ (v) be the resiliency of a service deployed at v; and
N (v, f) be the number of nodes that can be reached from v if all the edges in f fail together.

A vertex failure can always be represented as a set of edge failures that are incident on that vertex. The expected resiliency of a monitoring service with the monitor placed at v is given by:

$$E[R_m(v)] = \sum_{f \in 2^E} P(f) N(v, f) \qquad (1)$$

Figure 3:
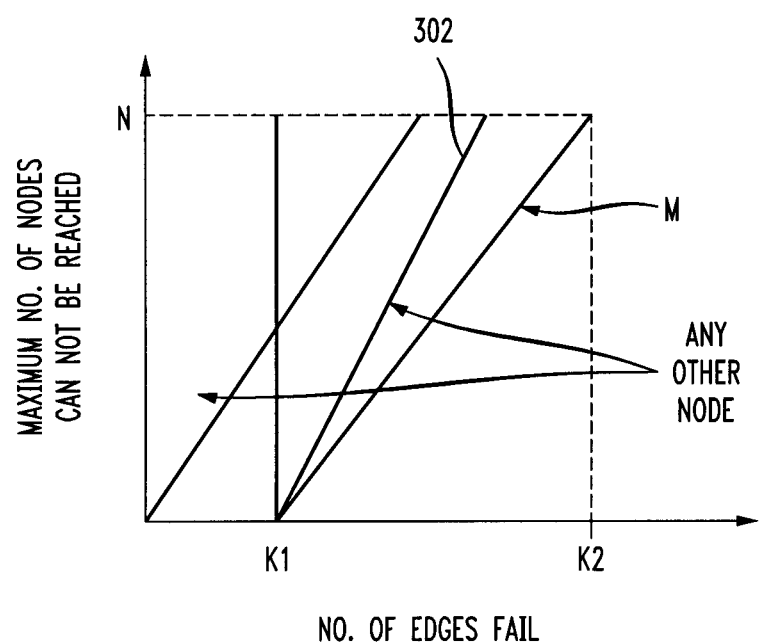
FIG. 3 presents an exemplary plot of maximum number of unreachable nodes versus number of failed edges, according to still another aspect of the invention.

With reference to plot 300 of FIG. 3, a node M will maximize the expected resiliency of a service if M can tolerate the maximum number of failures K1 (horizontal axis) before it loses connection with at least one consumer node (vertical axis), and if, for all successive failures, the rate at which M loses connection with other nodes is slower than any other node (slope of M is less than slope of 302). It is not always guaranteed to have a node that satisfies both these constraints. Nodes and link failures may follow a stochastic distribution.

Figure 4:
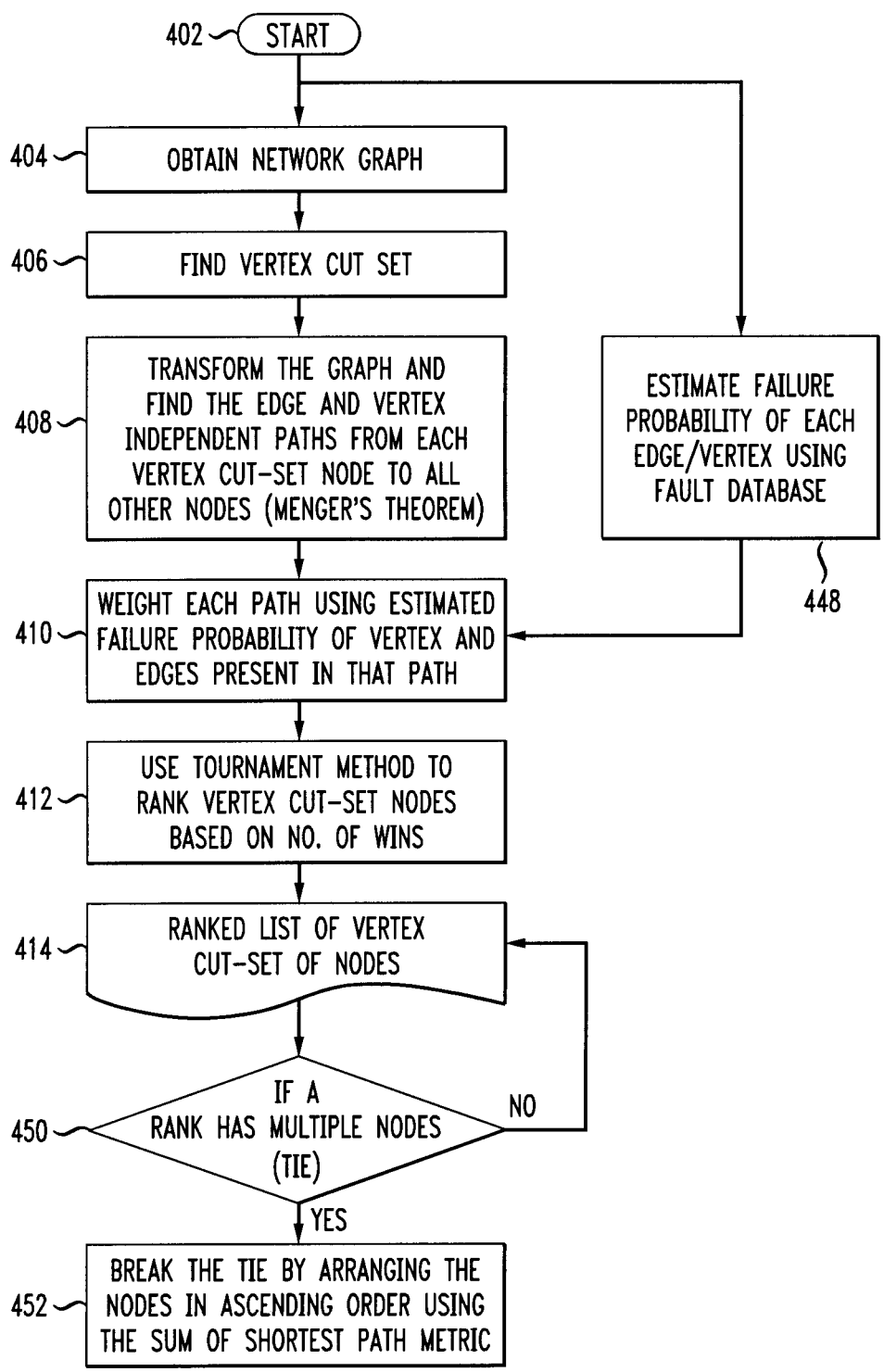
FIG. 4 is a flow chart of exemplary method steps, according to yet another aspect of the invention.

One or more embodiments of the invention address the issue of finding an optimal node M as a service provider, given a network graph, such that, given the stochastic distribution of network faults, selection of M maximizes expected resiliency of the service under all probable combinations of node and link failures. Also, the total distance from M to all other nodes must be minimum compared to all those nodes who are equally resilient as M. In one or more embodiments, employ a three step approach to address this issue. The following description is a simplified, intuitive version to facilitate understanding of the methodology for the person having ordinary skill in the art. Additional detail is provided below. Refer to FIG. 4. Find the nodes which can withstand the maximum number of node or link failures before the graph disconnects, as per, for example, step 406. Rank the nodes just found, based on the number of redundant paths they have with other nodes and the likelihood of each of these paths to fail, as per steps 408, 448, 410, and 412, yielding ranked list 414. Thus, a higher ranked node loses connection slower than the lower ranked nodes with increasing failures. If multiple nodes are tied at the same rank, further rank these nodes in the ascending order of their total distance from all other nodes, as per decision block 450 and step 452. Thus, if two nodes have the same rank after step 412, the node which has a smaller total distance to all other nodes will be ranked higher than the other.

In one specific, non-limiting implementation, find the nodes which can withstand the maximum number of node or link failures before the graph disconnects by finding the vertex cut-set to narrow down the candidate nodes which are more resilient than any other nodes, as in step 406. Use Menger's theorem in step 408 to calculate the edge-independent path to all other nodes from the nodes in the vertex cut-set. Each independent path is weighted with the marginal probability of failures along the path, in step 410. Use a tournament method, in step 412, to choose nodes that have higher weight compared to most of the other candidate nodes. If there are still multiple nodes with equal score, choose the one which has the minimum sum of network distance to other nodes as in step 452. Note that an exemplary tournament method is discussed below.

As noted, one non-limiting application of one or more techniques in accordance with the invention is a network monitoring service, wherein, given a network graph G=(V, E), a monitor is placed on a node which polls all other nodes in the network periodically to obtain their status. Find a node v in V where the monitoring service can be deployed such that the expected resiliency of the monitoring service is a maximum. For the sake of simplicity, in one or more embodiments, assume that all nodes and links are equally likely to fail in the network, and that failure of the monitoring node will completely bring down the service. In some instances, there may be constraints such as only one monitor can be deployed in the network and that all nodes may not be suitable for installation of the monitoring service.

Figure 5:
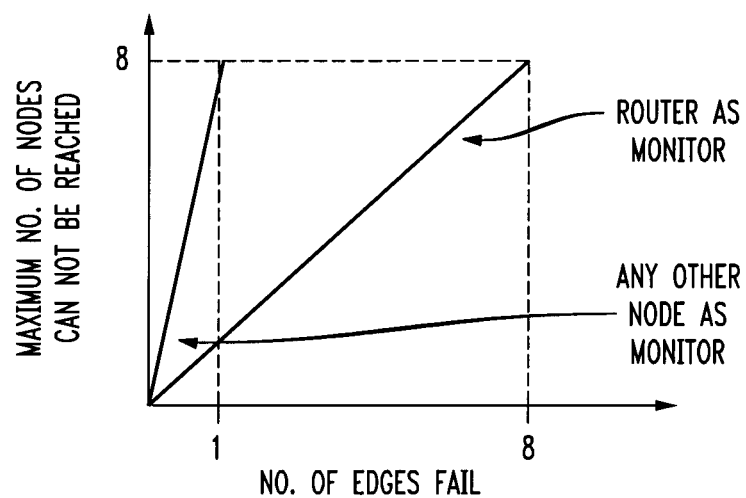
FIG. 5 presents an exemplary plot of maximum number of unreachable nodes versus number of failed edges, for the star network of FIG. 6.
Figure 6:
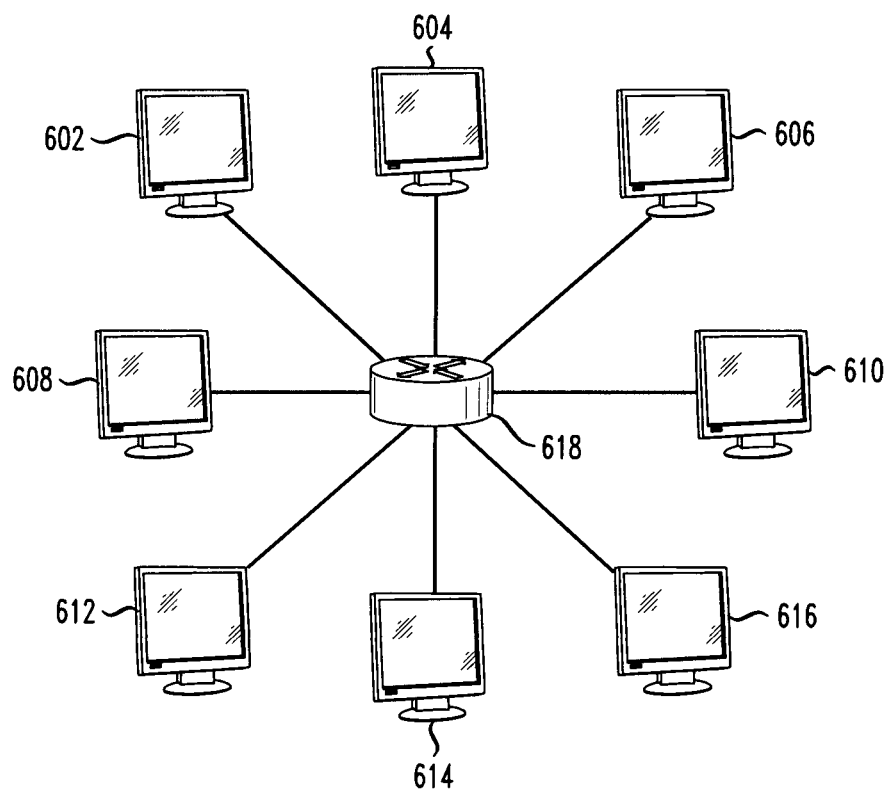
FIG. 6 shows an exemplary star network to which certain techniques of the invention can be applied.

With reference to FIGS. 5 and 6, one non-limiting example of a network to which certain techniques of the invention may be applied is a star network 600, wherein the vertex-cut set contains only the router 618. The monitoring service will be most resilient if it is deployed on the router 618. If the monitor cannot be deployed on the router 618, then any other node 602-616 can be chosen randomly, as all are equally resilient. Plot 500 of FIG. 5 shows that with the router as monitor, the number of nodes that cannot be reached is linear with the number of edges that fail, whereas with any other node as the monitor, failure of the edge for that node means all other nodes cannot be reached.

Figures 7, 8, 9:
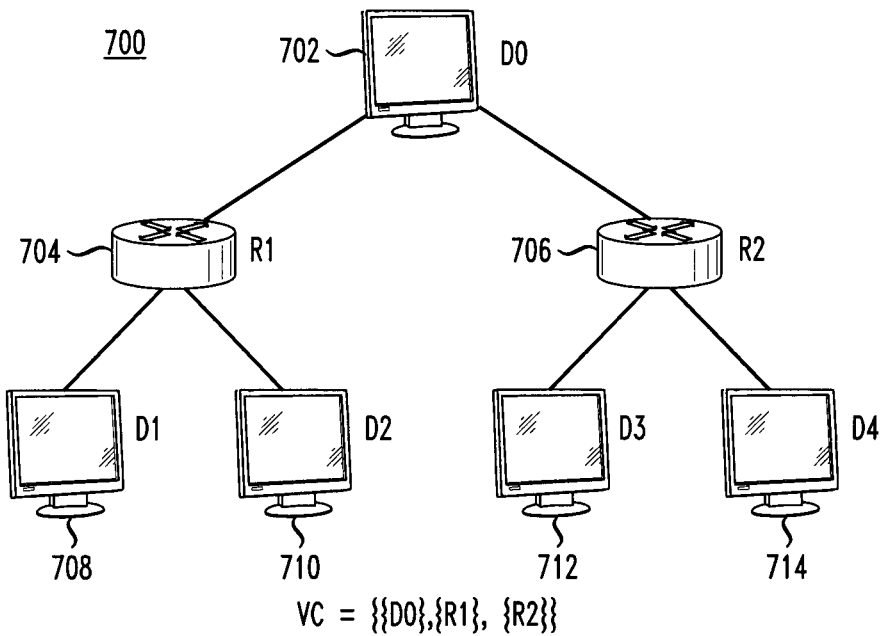
FIG. 7 shows an exemplary tree network to which certain techniques of the invention can be applied.
FIG. 8 is a table of certain edge-independent paths for the star network of FIG. 7.
FIG. 9 is a table of certain hops for the star network of FIG. 7.

With reference to FIGS. 7-9, another non-limiting example of a network to which certain techniques of the invention may be applied is a tree network 700. The table 800 of FIG. 8 shows the number of edge-independent paths from D0, R1, and R2 to the other nodes, while the table 900 of FIG. 9 shows the number of hops from D0, R1, and R2 to the other nodes. Note first and second routers R1 and R2 numbered 704, 706, as well as generalized nodes D0 thorough D4 numbered 702, 708, 710, 712, and 714.

Figure 10:
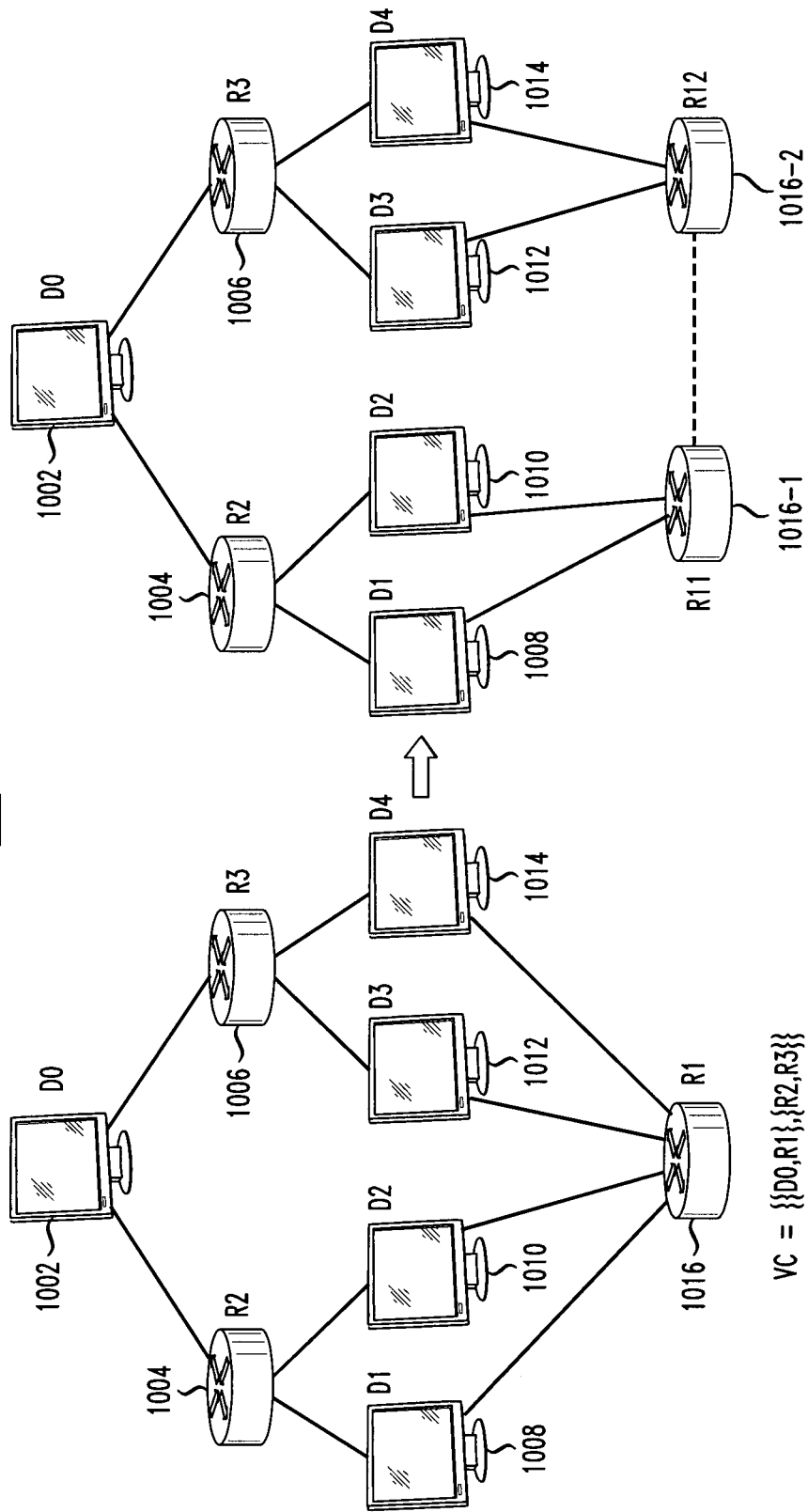
FIG. 10 shows an exemplary arbitrary network to which certain techniques of the invention can be applied.
Figures 11, 12:
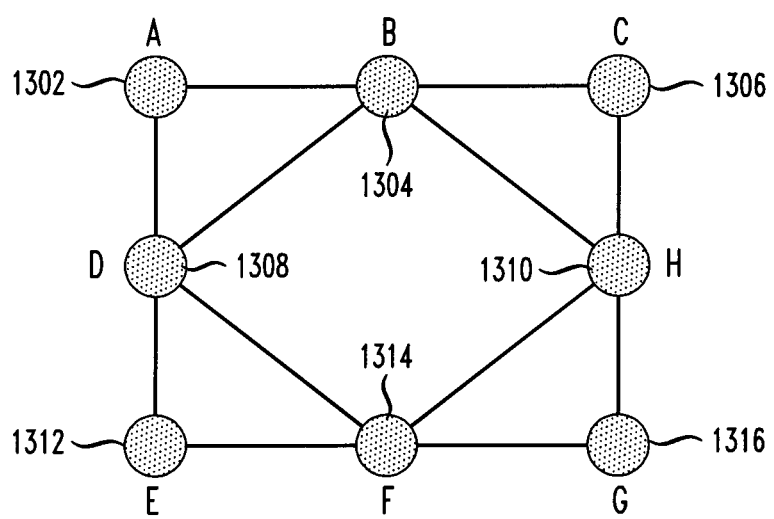
FIG. 11 is a table of certain edge-independent paths for the star network of FIG. 10.
FIG. 12 is a graph illustrating certain graph theory concepts pertaining to a cut set, and applicable to one or more embodiments of the invention.

With reference to FIGS. 10 and 11, yet another non-limiting example of a network to which certain techniques of the invention may be applied is an arbitrary network 1000. The table 1100 of FIG. 11 shows the number of edge-independent paths from routers R1, R2, and R3 (numbered, respectively, 1016, 1004, 1006) to the other nodes D0-D4, numbered, respectively, 1002, 1008, 1010, 1012, 1014. On the right hand side, router R1 is split into R11 and R12 numbered, respectively, 1016-1 and 1016-2, an example of graph transformation. In general, while identifying edge-independent paths between two vertices n1 and n2, if multiple edge-independent paths between n1 and n2 pass through a single vertex m, split m into two hypothetical vertices m1 and m2 and connect them by a single edge. All the edges that belong to the paths from n1 to m are now connected to m1, while all the edges that belong to the path from m to n2 are now connected with m2.

Furthermore, consider a technique to compute the sum of the shortest distance to all nodes. Given a Graph G=(V, E), seek, for a node v in V, to find the sum of shortest distance to all other nodes from v. In one or more embodiments, for each node v, in (V−v), find the shortest hop-distance from v to $v_i$, and sum up the distances. For example, in FIG. 10, the sum of the shortest distance for D1 may be determined as follows:

Shortest distance between D1 and R2=1
Shortest distance between D1 and R1=1
Shortest distance between D1 and R3=3
Shortest distance between D1 and D0=2
Shortest distance between D1 and D2=2
Shortest distance between D1 and D3=2
Shortest distance between D1 and D4=2
Sum of shortest distance=13

By way of review and provision of additional detail, one or more embodiments of the invention provide a method to maximize resiliency of a network service, including a near-optimal polynomial-time method to select a node from a given network of nodes such that it maximizes the expected resiliency of a service deployed at that node. Aspects of the invention can be used, for example, to find a list of nodes ordered by the resiliency that can be expected if the service is rendered from any of them. The approach can be adopted for all network services deployed on any network topology. Advantageously, one or more embodiments capture and use the stochastic distribution of failures. Furthermore, in one or more instances, a "graceful degradation approach" is provided, wherein, even if the graph disconnects, the service-node which loses connection slower than other nodes is chosen.

Yet further, aspects of the invention provide IT infrastructure resiliency information, which may be required to determine the expected overall enterprise resiliency of an organization, such as an enterprise or the like. One or more embodiments can be used to design resilient service delivery by finding maximally tolerant node(s); for example, by computing the expected structural resiliency of given service-offering nodes using network topology analysis. One or more embodiments aid in designing and/or evaluating existing service-replication/and/or disaster recovery plans.

Certain theorems and concepts from graph theory are pertinent to one or more embodiments of the invention. With reference to graph 1300 of FIG. 12, the vertex cut-set is the minimal set of nodes in a graph, removal of which disconnects the graph. The nodes are numbered 1302-1316. The vertex cut-set for a graph G=(V, E) is represented as VC={$X_1$, $X_2$, ..., $X_N$} such that each $X_i$ is a set of vertices {$V_1$, $V_2$, ..., $V_k$} and removal of all nodes in $X_i$ disconnects the graph. The properties of a vertex cut-set include:

Cardinality of each $X_i$ is the same
No set of vertices exists with cardinality<|$X_i$|, removal of which disconnects the graph.

Menger's theorem can be stated in an edge connectivity version and a vertex connectivity version. With regard to the former, Let G be a finite undirected graph and x and y two nonadjacent vertices. Then the theorem states that the size of the minimum edge cut for x and y is equal to the maximum number of pair-wise edge-independent paths from x to y. With regard to the latter, vertex connectivity version, let G be a finite undirected graph and x and y two nonadjacent vertices. Then the theorem states that the size of the minimum vertex cut for x and y is equal to the maximum number of pair-wise vertex-independent paths from x to y.

Figure 13:
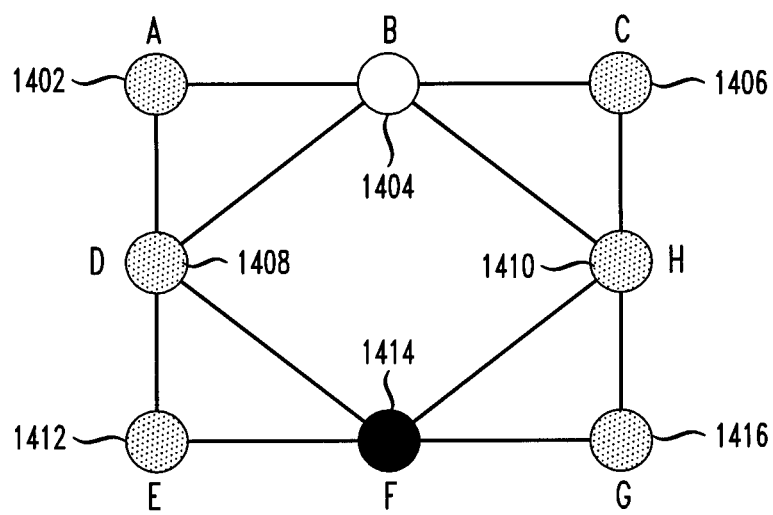
FIG. 13 is a graph illustrating certain graph theory concepts pertaining to Menger's theorem, and applicable to one or more embodiments of the invention.

FIG. 13 illustrates an example of Menger's theorem with a graph 1400 having nodes A through H numbered 1402, 1404, 1406, 1408, 1412, 1414, 1416, 1410, respectively. The edge independent paths from B to F include:

B→A→D→E→F;
B→D→F;
B→C→H→G→F; and
B→H→F.

The Edge-Cut=4.
The vertex independent paths from B to F include:
B→D→F; and
B→H→F.

The Vertex-Cut=2. All vertex independent paths are edge independent but not vice-versa.

Figure 14:
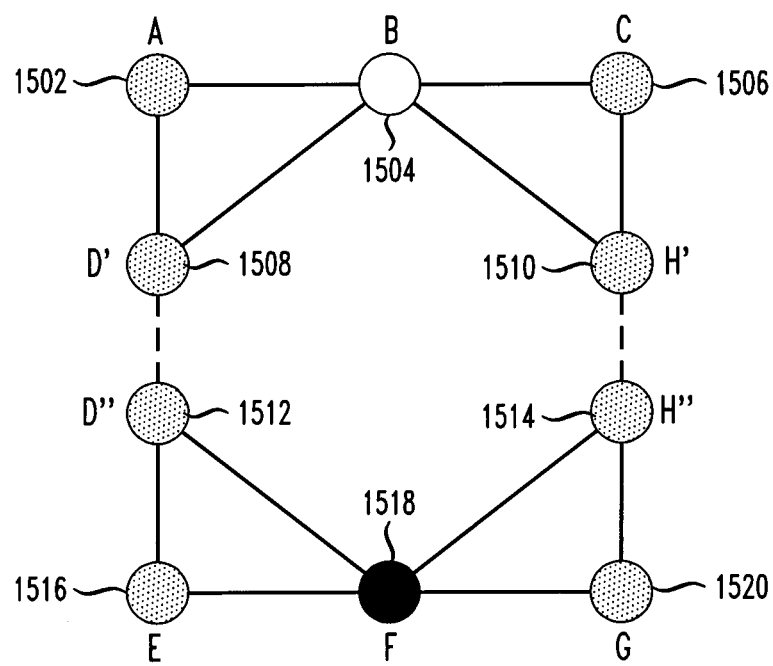
FIG. 14 is a graph illustrating certain graph theory concepts pertaining to combination of node and edge independent paths, and applicable to one or more embodiments of the invention.

With reference to graph 1500 of FIG. 14, in some instances, there may be reasons for combining node and edge independent paths. For example, it may be desirable to combine node and edge independence to correctly determine the fault tolerance of a path. Take the common vertices between two edge-independent paths from node B, numbered 1504, to node F, numbered 1518. Split each of them into two vertices connected by an edge (that is, D-prime 1508 and D-double prime 1512, as well as H-prime 1510 and H-double prime 1514). Find edge independent paths on the transformed graph. The number of edge-cuts and vertex-cuts between any two nodes will now be identical. The probability of failure for the inserted link will be the same as of the original node. Between B and F, the number of edge-independent paths equals the number of vertex independent paths. Nodes A, C, E, and G are numbered, respectively, 1502, 1506, 1516, and 1520.

Thus, one or more embodiments of the invention provide one or more of a system, method, and computer program product to increase, and preferably maximize, resilience of a network service. An optimal node M is found in a given network graph as a service provider such that the expected resiliency of the service should be maximized under all probable combination of node and link failures. The expected resiliency is computed using the failure-probability distribution of network elements and the number of independent paths between the service provider and the consumer nodes. Features and benefits of one or more embodiments of the invention include:

A method to quickly analyze a network topology to increase or maximize resiliency of a network service.

A near-optimal polynomial-time method to select a node from a given network of nodes such that it maximizes the expected resiliency of a service deployed at that node.

Applicability to find a list of nodes ordered by the resiliency that can be expected if the service is rendered from any of them.

Adaptable for all network services deployed on any network topology.

Capture and use of the stochastic distribution of failures.

"A graceful degradation approach"—even if the graph disconnects choose the service-node which loses connection slower than other nodes.

A method or system to get the fault distribution of network nodes and links by mining the failure events.

A method or system to find the potential candidate nodes to deploy a service in a given network topology by computing the vertex cut-set of the network graph.

A method which computes the vertex and edge independent paths to remaining nodes of the network topology from the potential candidate nodes.

A method to compute the expected resiliency of a service for each potential candidate node based on the number of independent paths and the fault distribution of the network.

A method or system to choose the set of candidate nodes to deploy a service by choosing those potential candidate nodes which maximize the expected resiliency of that service.

Calculating Resiliency Score

In one or more embodiments, calculate the resiliency score based on edge independent paths from each of the vertex cut nodes to all other nodes in the network graph. Let P be the set of all edge-independent paths from a vertex-cut node v to another node n. The resiliency score for v relative to n is equal to:

$$\sum_{\forall p \in P} 1 - Pr(\text{failure}(p)) \quad (2)$$

here Pr(failure(p)) denotes the probability of path p to fail.

Tournament Method to Rank Vertex Cut (VC) Nodes

In one or more embodiments, consider each vertex-cut node as a player. A match between two players includes multiple sets. Each set denotes a node in the network (except the two VC nodes under consideration). Therefore, the number of sets equals the total number of nodes in the network—2 (the two players). A player wins a set if the player has a higher resiliency score than its competitor relative to a particular node. A player wins the match if the player has won a greater number of sets than its competitor. A match is played between each pair of VC nodes. The players (VC nodes) are ranked according to the number of matches they win in the tournament.

Figure 15:
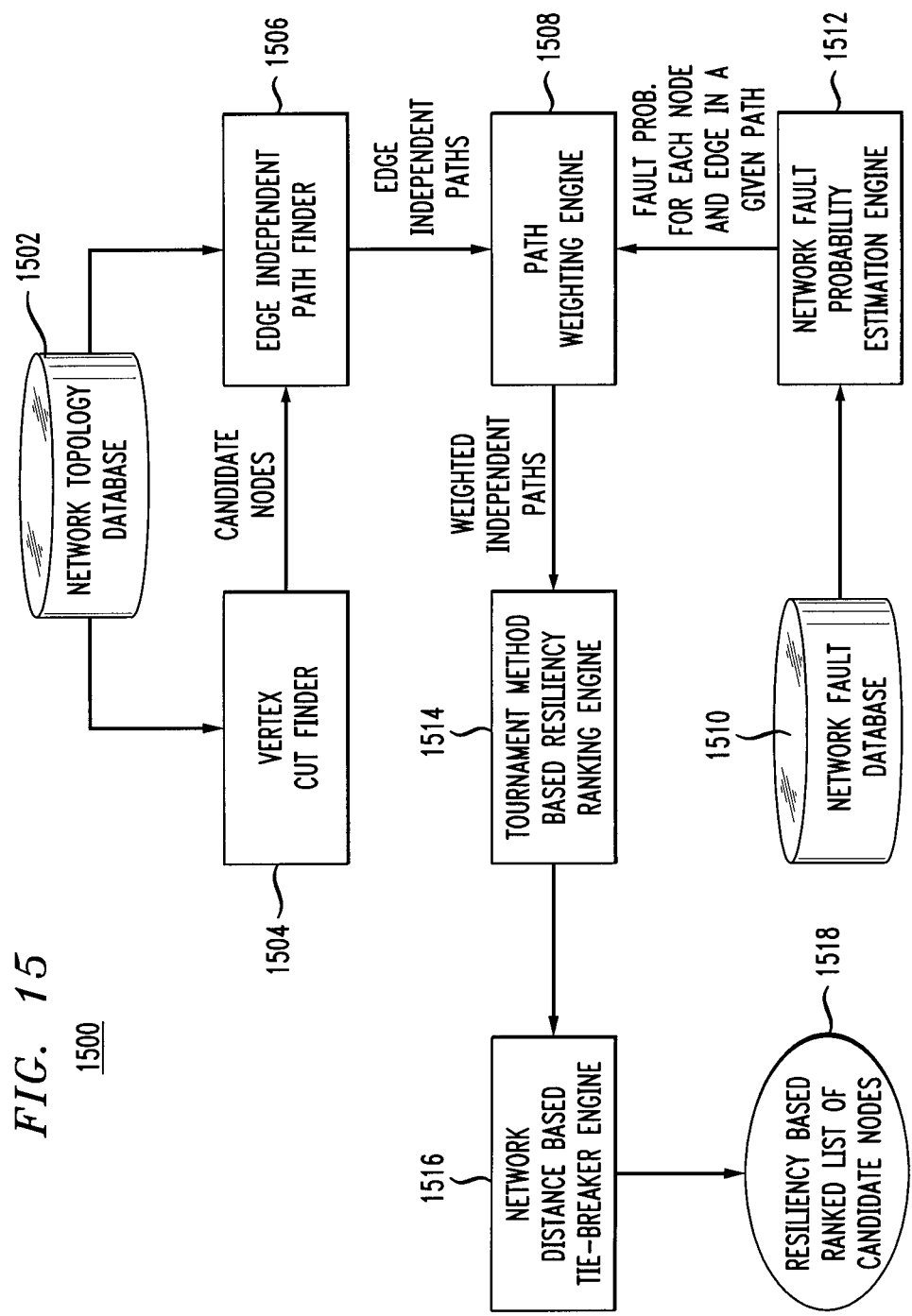
FIG. 15 is a block diagram of an exemplary software architecture, according to another aspect of the invention.

FIG. 15 shows an exemplary system block diagram 1500. Network topology database 1502 provides input to vertex cut finder 1504 and edge independent path finder 1506. The candidate nodes output by vertex cut finder 1504 are also input to edge independent path finder 1506, which outputs edge independent paths to path weighting engine 1508. Network fault database 1510 provides input to network fault probability estimation engine 1512, which outputs the fault probability for each node and edge in a given path to path weighting engine 1508. Path weighting engine 1508 outputs weighted independent paths to tournament method based resiliency ranking engine 1514, which employs network distance based tie-breaker engine 1516 to break any remaining ties and so obtain the resiliency based ranked list of candidate nodes 1518.

FIG. 4 presents a flow chart 400 of exemplary method steps, according to an aspect of the invention. Processing begins at step 402. Step 404 includes obtaining a set of data representing a graph of a computer network having a set of hardware nodes and a set of hardware links between the hardware nodes. The hardware links are represented as edges in the graph. The data may be obtained, for example, fro network topology database 1502. Step 406 includes finding a first subset (for example, a vertex cut set) of the set of hardware nodes, such that those of the hardware nodes in the first subset are able to withstand a maximum number of node and/or edge failures before the graph disconnects. Note that the vertex cut-set only ensures that any node outside the vertex cut-set can withstand equal or less number of node and/or edge failures compared to the nodes which are in the vertex-cut set and therefore they can be ignored. To further analyze which node in the vertex cut-set has the highest expected resiliency, carry out the rest of the steps discussed below. A non-limiting example of a way to carry out step 406 includes finding a vertex cut-set of the hardware nodes represented by the graph. Step 406 could be carried out, for example, with vertex cut finder 1504.

If there were only one node in the vertex cut set, no further processing would be necessary. However, in the general case, an additional step includes ranking the nodes in the first subset based on their expected resiliency. One non-limiting example of a way to carry out the step of ranking the nodes in the first subset based on their expected resiliency includes carrying out steps 408, 410, 412, and 414, as will be discussed in greater detail below. Once the ranking is completed, any tie in the ranks is broken by looking at the sum of network distances from the tied nodes to all other nodes, as in step 452. The node with the least distance gets the higher ranking. Step 452 could be carried out, for example, with network distance based tie-breaker engine 1516.

In one or more embodiments, the primary goal is to create a ranked list (with as few ties as possible), instead of finding the most resilient node. However, if a choice is made to select the node which has the highest rank, then it is necessary to look at the nodes that are tied at the top (the second subset, after the vertex cut set is ranked; this is required only for this particular case). If there is only one node at the top, then processing is complete. However, if more than one node is tied at the top, then use the sum of network distance to break the tie. On the other hand, if the complete ranked list is required, then carry out the tie-breaking process for every set of nodes that are tied at some rank.

Optionally, the ranked list can be stored in a tangible computer-readable recordable storage medium and/or displayed to a human subject (for example, a network architect) on a display device (omitted from figure for brevity). Optionally, a network service is physically located on a preferred one of the hardware nodes from the ranked list by loading hardware processor-executable program code, embodying the network service, onto a tangible computer-readable recordable storage medium associated with the preferred hardware node (that is, on the node per se or on a storage device connected to the node by a high reliability connection) (also omitted from figure for brevity).

In some cases, the step of ranking the nodes in the first subset based on their expected resiliency includes steps 408, 410, 412, and 414, with input from step 448. In step 408, use Menger's theorem. Transform the graph and find the edge and vertex independent paths from each vertex cut set node to all other nodes, using, for example, edge independent path finder 1506. In step 448, preferably in parallel, estimate the failure probability of each edge and vertex using the fault database 1510 and network fault probability estimation engine 1512. Carry out step 410 based on steps 408 and 448, using path weighting engine 1508 with input from estimation engine 1512 and edge independent path finder 1506. Step 410 includes weighting each path using the estimated failure probability of the vertex and edges present in that path. In step 412, use the tournament method to rank the vertex cut set nodes based on the number of wins. Step 412 can be carried out, for example, using ranking engine 1514. The result is the ranked list of vertex cut set nodes 414. As discussed several times above, if the ranked list 414 includes one (or more, as the case may be) ties, as determined in decision block 450, break the tie by arranging the nodes in ascending order using the sum of shortest path metric, as in step 452. The tie breaking can be carried out with tie-breaker engine 1516.

As noted, one non-limiting example of a network service is a network-monitoring service for monitoring the network. Such a service can function by periodically polling all of the hardware nodes in the network, other than the preferred hardware node on which the monitoring service is located, to obtain status. The preferred hardware node is selected to maximize resiliency of the monitoring service to the node failures and the edge failures. The preferred hardware nodded may be selected, in some cases, based upon assuming, for simplicity, that all of the hardware nodes and all of the edges representing the hardware links are equally likely to fail.

In one or more embodiments, the ranked list is ranked based on expected resiliency to be obtained by locating a network service on each given hardware node in the ranked list. The expected resiliency can be calculated in accordance with equation (1) above.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 16:
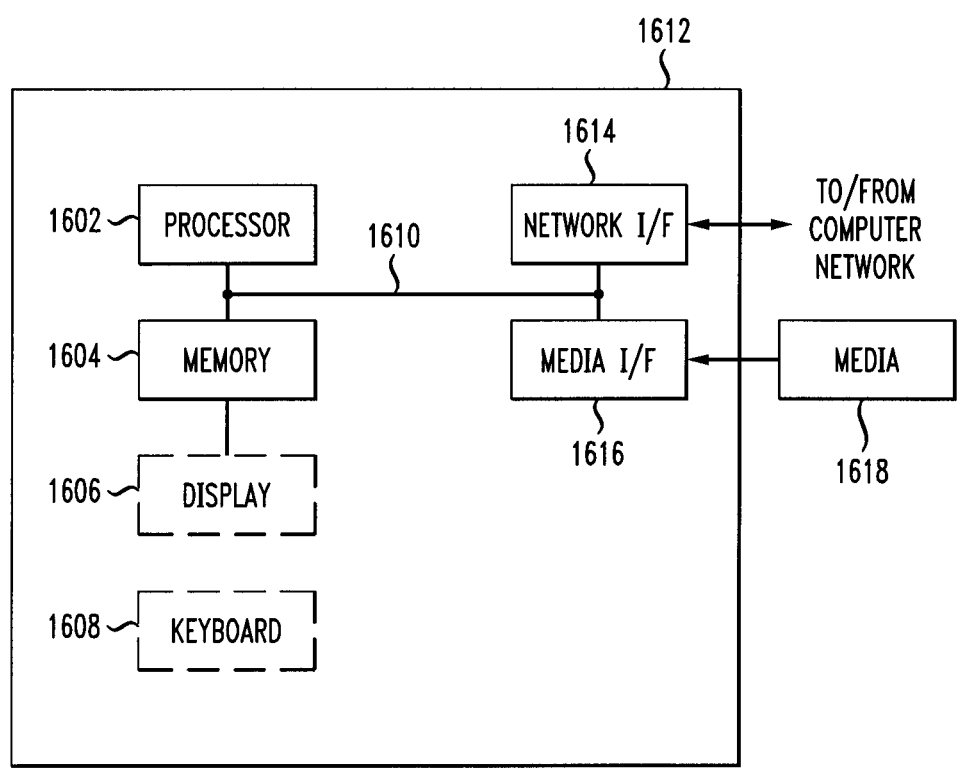
FIG. 16 depicts a computer system that may be useful in implementing one or more aspects and/or elements of the invention.

One or more embodiments can make use of software running on a general purpose computer or workstation. With reference to FIG. 16, such an implementation might employ, for example, a processor 1602, a memory 1604, and an input/output interface formed, for example, by a display 1606 and a keyboard 1608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1602, memory 1604, and input/output interface such as display 1606 and keyboard 1608 can be interconnected, for example, via bus 1610 as part of a data processing unit 1612. Suitable interconnections, for example via bus 1610, can also be provided to a network interface 1614, such as a network card, which can be provided to interface with a computer network, and to a media interface 1616, such as a diskette or CD-ROM drive, which can be provided to interface with media 1618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

Furthermore, the invention can take the form of a computer program product accessible from a computer-usable or computer-readable medium (for example, media 1618) providing program code for use by or in connection with a computer or any instruction implementation system. For the purposes of this description, a computer usable or computer readable medium can be any apparatus for use by or in connection with the instruction implementation system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a tangible computer-readable recordable storage medium (as distinct from a propagation or transmission medium) include a semiconductor or solid-state memory (for example memory 1604), magnetic tape, a removable computer diskette (for example media 1618), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 1602 coupled directly or indirectly to memory elements 1604 through a system bus 1610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1608, displays 1606, pointing devices, and the like) can be coupled to the system either directly (such as via bus 1610) or through intervening I/O controllers (omitted for clarity).

Network adapters such as network interface 1614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1612 as shown in FIG. 16) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable recordable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable recordable storage medium; the modules can include, for example, any or all of the components shown in FIG. 15. The method steps can then be carried out using the distinct software modules and/or sub-modules of the system, as described above, executing on one or more hardware processors 1602. Further, a computer program product can include a tangible computer-readable recordable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
   obtaining a set of data representing a graph of a computer network having a set of hardware nodes and a set of hardware links between the hardware nodes, the hardware links being represented as edges in the graph;
   finding a first subset of the set of hardware nodes, such that those of the hardware nodes in the first subset are able to withstand a maximum number of failures before the graph disconnects, the failures comprising at least one of node failures and edge failures; and
   ranking the hardware nodes in the first subset based on expected resiliency, to obtain a ranked list; wherein said expected resiliency is computed via $E[R_m(v)] = \Sigma_{f \in 2^E} P(f) N(v, f)$, wherein:
   E represents a set of edges among the first subset of hardware nodes f;
   P(f) represents a probability of all edges associated with the first subset f failing together;
   $R_m(v)$ represents a resiliency measure of a service deployed at a given node v; and
   N(v, f) represents the number of nodes that can be reached from the given node v if all edges in the first subset f fail together; and wherein said ranking comprises:
   identifying edge and vertex independent paths from each hardware node in the first subset to all other hardware nodes;
   weighting each of the edge and vertex independent paths with the estimated failure probability of the vertex and the edges in each independent path; and
   ranking the hardware nodes in the first subset based on the weighted edge and vertex independent paths to represent expected resiliency of each hardware node by determining the number of edge and vertex independent paths derived from each hardware node and the estimated probability that each of said paths will fail.

2. The method of claim 1, further comprising, in case of a tie between two or more of the hardware nodes in the ranked list, breaking the tie with a sum of shortest path metric.

3. The method of claim 1, further comprising storing the ranked list in a tangible computer-readable recordable storage medium.

4. The method of claim 1, further comprising displaying the ranked list to a human subject on a display device.

5. The method of claim 1, further comprising physically locating a network service on a preferred one of the hardware nodes from the ranked list by loading hardware processor-executable program code, embodying the network service, onto a tangible computer-readable recordable storage medium associated with the preferred hardware node.

6. The method of claim 1, wherein:
   the step of finding the first subset comprises finding a vertex cut-set of the hardware nodes represented by the graph; and
   the step of ranking the hardware nodes in the first subset further comprising:
   using Menger's theorem to transform the graph and find edge and vertex independent paths from each hardware node in the first subset to all other hardware nodes; and
   employing a tournament method to rank the hardware nodes in the vertex cut set, based upon the weighting step.

7. The method of claim 5, wherein the service comprises a network-monitoring service for monitoring the network.

8. The method of claim 7, wherein the network-monitoring service functions by periodically polling all of the hardware nodes in the network, other than the preferred hardware node on which the monitoring service is located, to obtain status, and wherein the preferred hardware node is selected to maximize resiliency of the monitoring service to the node failures and the edge failures.

9. The method of claim 8, wherein the preferred hardware node is selected based upon assuming that all of the hardware nodes and all of the edges representing the hardware links are equally likely to fail.

10. The method of claim 1, wherein the ranked list is ranked based on expected resiliency to be obtained by locating a network service on each given hardware node in the ranked list.

11. The method of claim 2, further comprising providing a system, wherein the system comprises distinct software modules, each of the distinct software modules being embodied on a tangible computer-readable recordable storage medium, and wherein the distinct software modules comprise a vertex cut finder module, an edge independent path finder module, a path weighting engine module, a network fault probability estimation engine module, a tournament method based resiliency ranking engine module, and a network distance based tie breaker engine module;
   wherein:
   the finding of the first subset of the set of hardware nodes is carried out by the vertex cut finder module, implemented on at least one hardware processor;
   the ranking of the hardware nodes in the first subset based on the expected resiliency is carried out by the edge independent path finder module, the path weighting engine module, the network fault probability estimation engine module, and the tournament method based resiliency ranking engine module, implemented on the at least one hardware processor; and
   the breaking of the tie is carried out by the network distance based tie breaker engine module, implemented on the at least one hardware processor.

12. A computer program product comprising a tangible non-transitory computer readable recordable storage medium including computer usable program code, the computer program product including:
   computer usable program code for obtaining a set of data representing a graph of a computer network having a set of hardware nodes and a set of hardware links between the hardware nodes, the hardware links being represented as edges in the graph;

computer usable program code for finding a first subset of the set of hardware nodes, such that those of the hardware nodes in the first subset are able to withstand a maximum number of failures before the graph disconnects, the failures comprising at least one of node failures and edge failures; and computer usable program code for ranking the hardware nodes in the first subset based on expected resiliency, to obtain a ranked list; wherein said expected resiliency is computed via $E[R_m(V)]=\Sigma_{f \in 2^E} P(f)N(v, f)$, wherein:

E represents a set of edges among the first subset of hardware nodes f;

P(f) represents a probability of all edges associated with the first subset f failing together;

$R_m(v)$ represents a resiliency measure of a service deployed at a given node v; and N(v, f) represents the number of nodes that can be reached from the given node v if all edges in the first subset f fail together; and wherein said ranking comprises:

identifying edge and vertex independent paths from each hardware node in the first subset to all other hardware nodes;

weighting each of the edge and vertex independent paths with the estimated failure probability of the vertex and the edges in each independent path; and ranking the hardware nodes in the first subset based on the weighted edge and vertex independent paths to represent expected resiliency of each hardware node by determining the number of edge and vertex independent paths derived from each hardware node and the estimated probability that each of said paths will fail.

13. The computer program product of claim 12, further comprising computer usable program code for, in case of a tie between two or more of the hardware nodes in the ranked list, breaking the tie with a sum of shortest path metric.

14. The computer program product of claim 12, wherein:
the computer usable program code for finding the first subset comprises computer usable program code for finding a vertex cut-set of the hardware nodes represented by the graph; and
the computer usable program code for ranking the hardware nodes in the first subset further comprising:
computer usable program code for using Menger's theorem to transform the graph and find edge and vertex independent paths from each hardware node in the first subset to all other hardware nodes; and
computer usable program code for employing a tournament method to rank the hardware nodes in the vertex cut set, based upon the weighting step.

15. The computer program product of claim 13, further comprising distinct software modules, each of the distinct software modules being embodied on the tangible computer-readable recordable storage medium, the distinct software modules comprising a vertex cut finder module, an edge independent path finder module, a path weighting engine module, a network fault probability estimation engine module, a tournament method based resiliency ranking engine module, and a network distance based tie breaker engine module;
wherein:
the vertex cut finder module comprises the computer usable program code for finding of the first subset of the set of hardware;
the edge independent path finder module, the path weighting engine module, the network fault probability estimation engine module, and the tournament method based resiliency ranking engine module comprise the computer usable program code for the ranking of the hardware nodes in the first subset based on the expected resiliency; and
the network distance based tie breaker engine module comprises the computer usable program code for the breaking of the tie.

16. An apparatus comprising:
a memory; and
at least one processor, coupled to the memory, and operative to:
obtain a set of data representing a graph of a computer network having a set of hardware nodes and a set of hardware links between the hardware nodes, the hardware links being represented as edges in the graph;
find a first subset of the set of hardware nodes, such that those of the hardware nodes in the first subset are able to withstand a maximum number of failures before the graph disconnects, the failures comprising at least one of node failures and edge failures; and
rank the hardware nodes in the first subset based on expected resiliency, to obtain a ranked list; wherein said expected resiliency is computed via $E[R_m(v)]=\Sigma_{f \in 2^E} P(f)N(v, f)$, wherein:
E represents a set of edges among the first subset of hardware nodes f;
P(f) represents a probability of all edges associated with the first subset f failing together;
$R_m(v)$ represents a resiliency measure of a service deployed at a given node v; and
N(v, f) represents the number of nodes that can be reached from the given node v if all edges in the first subset f fail together; and wherein said ranking comprises:
identifying edge and vertex independent paths from each hardware node in the first subset to all other hardware nodes;
weighting each of the edge and vertex independent paths with the estimated failure probability of the vertex and the edges in each independent path; and
ranking the hardware nodes in the first subset based on the weighted edge and vertex independent paths to represent expected resiliency of each hardware node by determining the number of edge and vertex independent paths derived from each hardware node and the estimated probability that each of said paths will fail.

17. The apparatus of claim 16, wherein the at least one processor is further operative, in case of a tie between two or more of the hardware nodes in the ranked list, to break the tie with a sum of shortest path metric.

18. The apparatus of claim 16, wherein the at least one processor is operative to:
find the first subset by finding a vertex cut-set of the hardware nodes represented by the graph; and
rank the hardware nodes in the first subset by:
using Menger's theorem to transform the graph and find edge and vertex independent paths from each hardware node in the first subset to all other hardware nodes; and
employing a tournament method to rank the hardware nodes in the vertex cut set, based upon the weighting step.

19. The apparatus of claim 17, further comprising a tangible computer-readable recordable storage medium having distinct software modules embodied thereon, wherein the distinct software modules comprise a vertex cut finder module, an edge independent path finder module, a path weighting engine module, a network fault probability estimation engine module, a tournament method based resiliency ranking engine module, and a network distance based tie breaker engine module;

wherein:
- the finding of the first subset of the set of hardware nodes is carried out by the vertex cut finder module, implemented on the at least one processor;
- the ranking of the hardware nodes in the first subset based on the expected resiliency is carried out by the edge independent path finder module, the path weighting engine module, the network fault probability estimation engine module, and the tournament method based resiliency ranking engine module, implemented on the at least one processor; and
- the breaking of the tie is carried out by the network distance based tie breaker engine module, implemented on the at least one processor.

20. An apparatus comprising:
- means for obtaining a set of data representing a graph of a computer network having a set of hardware nodes and a set of hardware links between the hardware nodes, the hardware links being represented as edges in the graph;
- means for finding a first subset of the set of hardware nodes, such that those of the hardware nodes in the first subset are able to withstand a maximum number of failures before the graph disconnects, the failures comprising at least one of node failures and edge failures; and
- means for ranking the hardware nodes in the first subset based on expected resiliency, to obtain a ranked list; wherein said expected resiliency is computed via $E[R_m(v)] = \Sigma_{f \in 2^E} P(f) N(v, f)$, wherein:
  - E represents a set of edges among the first subset of hardware nodes f;
  - P(f) represents a probability of all edges associated with the first subset f failing together;
  - $R_m(v)$ represents a resiliency measure of a service deployed at a given node v; and
  - N(v, f) represents the number of nodes that can be reached from the given node v if all edges in the first subset f fail together; and wherein said ranking comprises:
- identifying edge and vertex independent paths from each hardware node in the first subset to all other hardware nodes;
- weighting each of the edge and vertex independent paths with the estimated failure probability of the vertex and the edges in each independent path; and
- ranking the hardware nodes in the first subset based on the weighted edge and vertex independent paths to represent expected resiliency of each hardware node by determining the number of edge and vertex independent paths derived from each hardware node and the estimated probability that each of said paths will fail.

* * * * *